(12) United States Patent  (10) Patent No.: US 7,756,875 B2
Lakhani et al.  (45) Date of Patent: Jul. 13, 2010

(54) METHOD AND SYSTEM FOR E-COMMERCE PACKAGES

(75) Inventors: Aalim Lakhani, Toronto (CA); Victor Chan, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 1467 days.

(21) Appl. No.: 09/943,061

(22) Filed: Aug. 30, 2001

(65) Prior Publication Data

US 2002/0065803 A1   May 30, 2002

(30) Foreign Application Priority Data

Nov. 30, 2000   (CA)   .................................... 2327076

(51) Int. Cl.
  G06F 7/00   (2006.01)
  G06F 17/00   (2006.01)
  G06F 17/30   (2006.01)
(52) U.S. Cl. ..................... 707/740; 707/771; 707/799
(58) Field of Classification Search .................... 707/1, 707/3, 10, 100, 104.1; 705/1, 55, 14, 26–29; 725/60–68, 131; 235/383; 713/200; 709/203, 709/223
  See application file for complete search history.

(56) References Cited

U.S. PATENT DOCUMENTS

| 5,459,306 | A | * | 10/1995 | Stein et al. ................... 235/383 |
| 5,469,206 | A | * | 11/1995 | Strubbe et al. ................ 725/60 |
| 5,664,110 | A | | 9/1997 | Green et al. |
| 5,740,425 | A | | 4/1998 | Povilus |
| 5,890,175 | A | | 3/1999 | Wong et al. |
| 5,898,594 | A | | 4/1999 | Leason et al. |
| 6,041,411 | A | * | 3/2000 | Wyatt ......................... 713/200 |
| 6,591,247 | B2 | * | 7/2003 | Stern .......................... 705/14 |
| 6,606,744 | B1 | * | 8/2003 | Mikurak ..................... 717/174 |

OTHER PUBLICATIONS

Why Hawaii? Vacation and Cruise Packages, http://web.archive.org/web/20000815054008/leisure.travelocity.com/Vacations/Finder, 2000 Travelocity.com LP, Sep. 7, 2005, 18 pages.
Canadian Office Action of Jun. 17, 2009, Appl. No. 2,327,076, 7 pages.

* cited by examiner

*Primary Examiner*—Apu M Mofiz
*Assistant Examiner*—Susan Y Chen
(74) *Attorney, Agent, or Firm*—Sawyer Law Group, P.C.

(57) ABSTRACT

A system and method for enabling the e-commerce purchasing of grouped merchandise and/or services, known as packages, is disclosed. The subject e-commerce system and method comprises a catalog database comprising package data correlated to at least one package; a selection module coupled to the catalog database for allowing a customer to select a package for purchase; and a resolution module coupled to the catalog database for resolving unresolved attributes in the selected package. Preferably, the catalog database further comprises item data correlated to a plurality of items, wherein each item is fully resolved; product data correlated to at least one product, wherein said at least one product comprises at least one unresolved attribute; and attribute data.

22 Claims, 8 Drawing Sheets

| CATALOG ENTRY TABLE ||||
| CATENTRY ID | TYPE | DESCRIPTION | SKU |
| --- | --- | --- | --- |
| 101 | PRODUCT | sweater | |
| 102 | PRODUCT | gloves | |
| 110 | ITEM | large, blue sweater | LBS |
| 111 | ITEM | large, green sweater | LGS |
| 112 | ITEM | small, blue sweater | SBS |
| 113 | ITEM | small, green sweater | SGS |
| 120 | ITEM | leather gloves | LG |
| 121 | ITEM | vinyl gloves | VG |
| 150 | UR-PACKAGE | package: sweater; gloves | |
| 151 | FR-PACKAGE | package: large blue sweater; leather gloves | LBS-LG |
| 152 | FR-PACKAGE | package: large green sweater; leather gloves | LGS-LG |
| 153 | FR-PACKAGE | package: small blue sweater; leather gloves | SBS-LG |
| 154 | FR-PACKAGE | package: small green sweater; leather gloves | SGS-LG |
| 155 | FR-PACKAGE | package: large blue sweater; vinyl gloves | LBS-VG |
| 156 | FR-PACKAGE | package: large green sweater; vinyl gloves | LGS-VG |
| 157 | FR-PACKAGE | package: small blue sweater; vinyl gloves | SBS-VG |
| 158 | FR-PACKAGE | package: small green sweater; vinyl gloves | SGS-VG |

FIG. 2A

PRODUCT ATTRIBUTE TABLE (502)

| ATTRIBUTE ID (560) | NAME (562) | PRODUCT ID (564) |
|---|---|---|
| 201 | SWEATER-SIZE | 101 |
| 202 | SWEATER-COLOUR | 101 |
| 203 | GLOVES-MATERIAL | 102 |

Fig. 2B

PRODUCT ATTRIBUTE VALUE TABLE (504)

| ATTRIBUTE VALUE ID (570) | ATTRIBUTE ID (572) | VALUE (574) | ITEM ID (576) |
|---|---|---|---|
| 301 | 201 | SMALL | 112 |
| 302 | 201 | LARGE | 110 |
| 303 | 201 | SMALL | 113 |
| 304 | 201 | LARGE | 111 |
| 305 | 202 | BLUE | 112 |
| 306 | 202 | GREEN | 111 |
| 307 | 202 | BLUE | 110 |
| 308 | 202 | GREEN | 113 |
| 309 | 203 | VINYL | 121 |
| 310 | 203 | LEATHER | 120 |

Fig. 2C

PACKAGE ATTRIBUTE TABLE (506)

| PACKAGE ATTRIBUTE ID (580) | ATTRIBUTE ID (582) | UR-PACKAGE ID (584) |
|---|---|---|
| 401 | 201 | 150 |
| 402 | 202 | 150 |
| 403 | 203 | 150 |

Fig. 2D

| PACKAGE ATTRIBUTE VALUE TABLE | | |
|---|---|---|
| PACKAGE ATTRIBUTE ID | ATTRIBUTE VALUE ID | FR-PACKAGE ID |
| 401 | 301 | 153 |
| 401 | 302 | 151 |
| 401 | 303 | 154 |
| 401 | 304 | 152 |
| 401 | 301 | 157 |
| 401 | 302 | 155 |
| 401 | 303 | 158 |
| 401 | 304 | 156 |
| 402 | 305 | 153 |
| 402 | 306 | 152 |
| 402 | 307 | 151 |
| 402 | 308 | 154 |
| 402 | 305 | 157 |
| 402 | 306 | 156 |
| 402 | 307 | 155 |
| 402 | 308 | 158 |
| 403 | 309 | 155 |
| 403 | 310 | 151 |
| 403 | 309 | 156 |
| 403 | 310 | 152 |
| 403 | 309 | 157 |
| 403 | 310 | 153 |
| 403 | 309 | 158 |
| 403 | 310 | 154 |

FIG. 2E

| PACKAGE RELATIONSHIP TABLE |||
| --- | --- | --- |
| PACKAGE ID | COMPONENT ID | TYPE |
| 150 | 101 | UR-PackageRel |
| 150 | 102 | UR-PackageRel |
| 151 | 110 | FR-PackageRel |
| 151 | 120 | FR-Package Rel |
| 152 | 111 | FR-PackageRel |
| 152 | 120 | FR-PackageRel |
| 153 | 112 | FR-PackageRel |
| 153 | 120 | FR-PackageRel |
| 154 | 113 | FR-PackageRel |
| 154 | 120 | FR-PackageRel |
| 155 | 110 | FR-PackageRel |
| 155 | 121 | FR-PackageRel |
| 156 | 111 | FR-PackageRel |
| 156 | 121 | FR-PackageRel |
| 157 | 112 | FR-PackageRel |
| 157 | 121 | FR-PackageRel |
| 158 | 113 | FR-PackageRel |
| 158 | 121 | FR-PackageRel |

FIG. 2F

METHOD AND SYSTEM FOR E-COMMERCE PACKAGES

CROSS-REFERENCE TO RELATED APPLICATIONS

This application claims benefit under 35 USC 119 of Canadian Application 2,327,076 filed Nov. 30, 2000.

FIELD OF THE INVENTION

The present invention relates to the field of e-commerce, and in particular, to the purchasing of packages of items.

BACKGROUND OF THE INVENTION

In the world of e-commerce, customers can purchase merchandise and services online from electronic catalogs, typically through websites on the Internet. Such purchases typically involve the consumer browsing or searching through an electronic catalog and selecting merchandise or services the consumer wishes to purchase.

However, the applicants have recognized that there may be promotional and other advantages to be gained if merchandise and/or services could be grouped together. From the consumer's perspective, group purchases may involve price discounts or other incentives for volume purchases as well as making purchasing decisions easier. From the merchant's perspective, grouping merchandise together may result in increased sales volumes, and may assist in promoting new or low volume products with more popular, high volume products.

There is accordingly a need for a system and methodology for enabling the e-commerce purchasing of grouped merchandise and/or services (hereinafter referred to as "packages").

SUMMARY OF THE INVENTION

A system and method for enabling the e-commerce purchasing of grouped merchandise and/or services, known as packages, is disclosed. The subject e-commerce system comprises a catalog database comprising package data correlated to at least one package; a selection module coupled to the catalog database for allowing a customer to select a package for purchase; and a resolution module coupled to the catalog database for resolving unresolved attributes in the selected package. Preferably, the catalog database further comprises item data correlated to a plurality of items, wherein each item is fully resolved; product data correlated to at least one product, wherein said at least one product comprises at least one unresolved attribute; and attribute data.

The subject invention is also directed towards an e-commerce method comprising the steps of creating a catalog database comprising package data correlated to at least one package, wherein said at least one package comprises at least one unresolved attribute; determining a selected package from the catalog database; and resolving said at least one unresolved attribute. Preferably the step of resolving the unresolved attribute involves determining a selected attribute value for said at least one unresolved attribute.

It will be appreciated by those skilled in the art that the invention herein can be implemented in a computer program which can be stored in a recordable data storage medium for use in a computer system, or on a network such as the Internet for use in a computer system.

BRIEF DESCRIPTION OF THE DRAWINGS

The present invention will now be described, by way of example only, with reference to the following drawings, in which like reference numerals refer to like parts and in which:

FIGS. 2A-2F together comprise various database tables of the catalog database of FIG. 1.

DETAILED DESCRIPTION OF THE PREFERRED EMBODIMENTS

The present invention relates to a system and method for enabling the e-commerce purchasing of grouped merchandise and/or services, known as packages. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
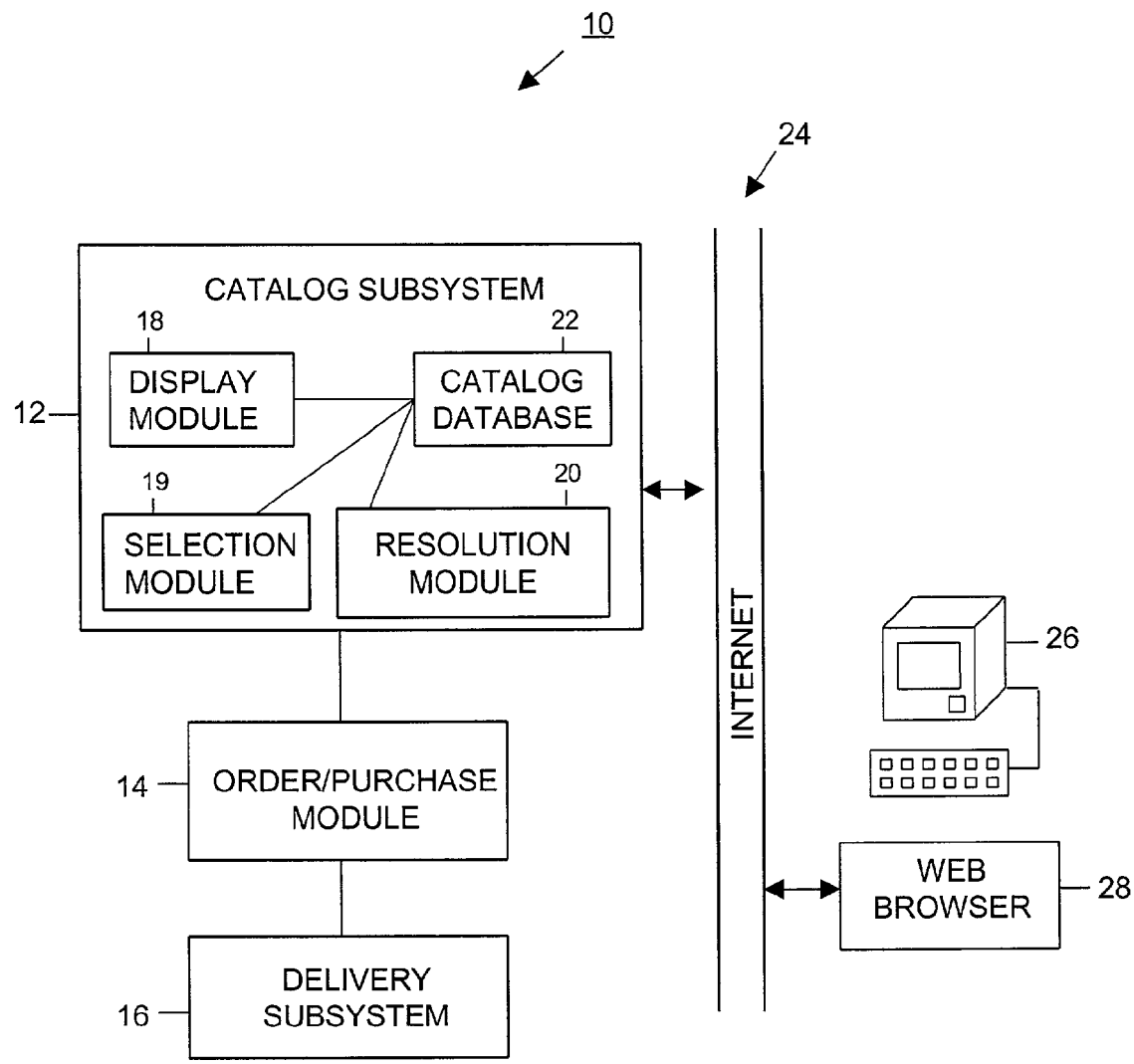
FIG. 1 is a schematic diagram of an e-commerce system made in accordance with the present invention.

Referring to FIG. 1, illustrated therein is a preferred embodiment of the e-commerce system of the subject invention. The system, shown generally as 10, comprises a catalog subsystem 12, an ordering and payment module 14 and a delivery subsystem 16. The catalog subsystem 12 in turn comprises a display module 18, a selection module 19, a resolution module 20, and a catalog database 22.

The e-commerce system 10 is connected to a global communications network 24, typically the Internet. Consumers 26 are able to access the system 10 to purchase merchandise and services using remote computers, in most instances running web browsers 28, as will be understood.

The system 10 will typically be implemented as a catalog website running on a website server connected to (and having a uniform resource locator or URL on) the Internet 24. As will be discussed in greater detail below, the catalog database 22 contains data correlated to the various merchandise and/or services available for purchase by the consumer 26. The catalog data may also contain image, sound or other non-textual data corresponding to each piece of merchandise and service offered for sale. In a known manner, the display module 18 generates and displays (typically on the consumer's 26 web browser 28 operating on a remote computer) web pages containing images of the merchandise and services as well as related marketing details such as pricing, sizes and colours, through which the consumer can browse before making a decision to purchase.

The payment module 14 coordinates the online payment of purchases, typically through the use of credit card numbers. The delivery subsystem 16 coordinates the shipping of purchases to the customer 26.

Referring simultaneously to FIGS. 2A through 2F, illustrated therein are various tables of information stored within the catalog database 22. Typically catalog database 22 will include a catalog entry table 500, a product attribute table 502, a product attribute value table 504, a package attribute table 506, a package attribute value table 508 and a package relationship table 510.

The catalog entry table 500 contains data correlated to products 520, items 522 and packages 524. The packages data 524 includes unresolved packages 526 and fully resolved packages 528, as will be explained in greater detail below.

The sample data contained in the tables 500, 502, 504, 506, 508, 510 has been included for illustrative purposes and references gloves and sweater merchandise. In the sample data, the gloves may be purchased in two materials, leather and vinyl. As well, the sweaters in the example are available in two colours, blue and green, and also come in two sizes, small and large. These options with respect to the sweaters and gloves are referred to throughout herein as attributes. In the example provided, sweaters have two attributes, size and colour, while gloves have a single attribute, material.

When used herein, the term "product" is intended to mean a piece of merchandise or a service which has at least one unresolved attribute. Correspondingly, when used herein, the term "item" is intended to mean a piece of merchandise or a service with no unresolved attributes. Thus, in the provided example, sweaters and gloves (with no additional information) are products 520, since the attributes of size, colour and/or material are unresolved, meaning that they are unspecified or undefined. On the other hand, a large blue sweater is an item 522 as is a pair of leather gloves, because all of their respective attributes have been specified.

As should be understood, while the items 522 in the example provided all correlate to the products 520, in the sense that they are fully resolved versions of the products 520 (sweaters and gloves), it is not necessary that all items 522 correlate to a product 520. As will be understood, some items 522 may not have attributes which are resolved, and hence will not have a correlated product 520.

The example provided also illustrates packages 524. Packages 524 are created by grouping merchandise and/or services for sale all together. Unresolved packages 526 include at least one product 520; accordingly, each unresolved package 526 requires the resolution of at least one attribute. Unresolved packages 526 may include products 520, items 522, and even other packages 524. Resolved packages 528 contain only items 522.

Referring to FIG. 2A, as noted previously, the catalog entry table 500 contains data correlated to the merchandise and services offered for sale. This data is generally organized into fields in the database, for each entry: catalog entry identifier 550, catalog entry type 552, catalog entry description 554 and stock keeping unit ("SKU") identifier 556.

As shown in FIG. 2B, the product attribute table 502 contains data correlated to each of the various types of attributes of the various products 520 available for purchase. The product attribute table 502 includes an attribute identification field 560, an attribute name field 562 and a product identification field 564. Every type of attribute is provided with a unique attribute name or type descriptor 562. In the example provided, the descriptors 562 indicate that there are three different attributes, two for sweaters (size and colour) and one for gloves (material). Each of these attributes is provided with a unique attribute identifier 560, and each attribute is linked to a product 520 in the catalog entry table 500 through a product identifier 564 correlated to the catalog entry identifier 550.

Referring now to FIG. 2C, the product attribute value table 504 contains data correlated to the specific values for each of the various types of attributes 562 of the various products 520 available for purchase. The product attribute value table 504 includes an attribute value identification field 570, an attribute identification field 572, an attribute value field 574, and an item identification field 576. As can be seen in the sample data provided, six different attribute values 574 are provided, small, large, blue, green, vinyl and leather. Each value 574 is linked to an item 522 in the catalog entry table 500 through an item identifier 576 correlated to the catalog entry identifier 550. As well, each value 574 is cross-referenced to its attribute type 562, through an attribute identifier 572 correlated to the attribute identifier 560 in the product attribute table 502. As a result, the product attribute value table 504 identifies the value 574 and attribute type 562 of all of the attributes possessed by each item 522.

As shown in FIG. 2D, the package attribute table 506 contains data correlated to each of the types of attributes of the various unresolved packages 526 available for purchase. The package attribute table 506 includes a package attribute identification field 580, an attribute identification field 582 and an unresolved package identification field 584. As noted, unresolved packages 526 contain at least one product 520 and accordingly, each unresolved package 526 requires the resolution of at least one product attribute 562. Every type of product attribute 562 required to resolve the unresolved packages 526 is provided with a unique package attribute identifier 580, linked to a product attribute identifier 560 in the product attribute table 502 through an attribute identifier 582 correlated to the attribute identifier 560. Each of these attributes 562 is also linked to an unresolved package 526 in the catalog entry table 500 through an unresolved package identifier 584 correlated to the catalog entry identifier 550.

Referring now to FIG. 2E, the package attribute value table 508 serves to indirectly cross-reference each of the various resolved packages 528 available for purchase with the specific attribute values 574 of its component product(s) 520. The package attribute value table 508 includes a package attribute identification field 590, an attribute value identification field 592, and a fully resolved package identification field 594. Each resolved package 528 has an entry in the table 508 for each of its attribute values 574. Each entry is linked to a specific resolved package 528 in the catalog entry table 500 through a fully resolved package identifier 594 correlated to the catalog entry identifier 550. As well, each fully resolved package identifier 594 is cross-referenced to its component product 520 attribute values 574, through an attribute value identifier 592 correlated to the attribute value identifier 570 in the product attribute value table 504. Each entry in the table 508 is provided with a package attribute identifier 590 correlated to the package attribute identifier 580 in the package attribute table 506.

As shown in FIG. 2F, the package relationship table 510 provides data correlating each package 524 with its constituent components of products 520 and/or items 522. The table 510 includes a package identification field 600, a component identification field 602 and a package type field 604. Each package 524 has an entry in the table 510 for each of its components. Each entry is linked to a specific package 524 in the catalog entry table 500 through a package identifier 600 correlated to the corresponding catalog entry identifier 550. As well, each package identifier 600 is cross-referenced to its product 520 and/or item 522 components, through a component identifier 602 correlated to the corresponding catalog entry identifier 550 in the catalog entry table 500. Each entry is also provided with a package type indicator 604 containing data indicating whether the package identifier 600 corresponds to an unresolved package or a fully resolved package.

Figure 3A:
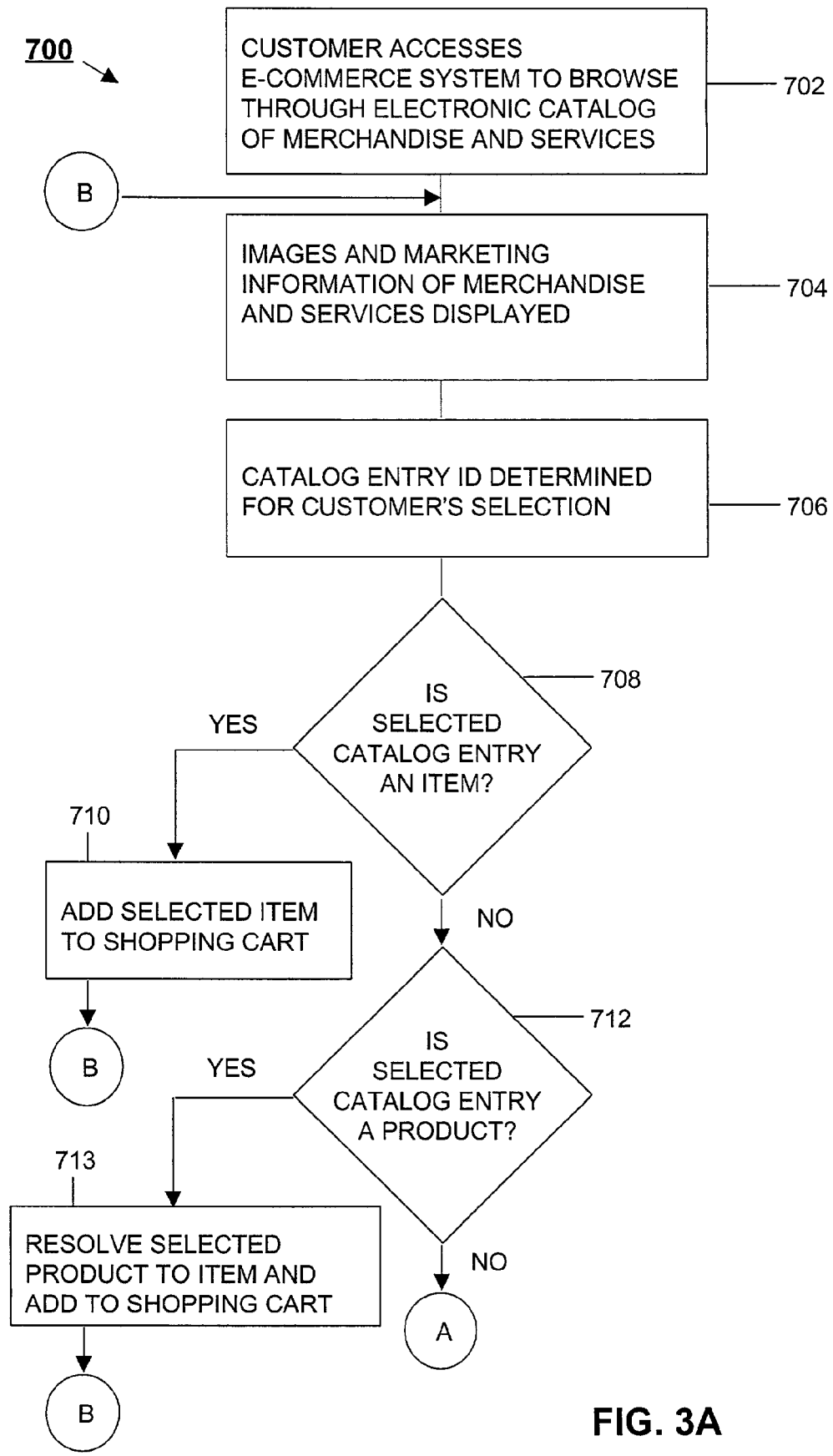
FIGS. 3A-3C together comprise a flow chart showing an e-commerce method employed using the e-commerce system of the present invention.
Figure 3B:
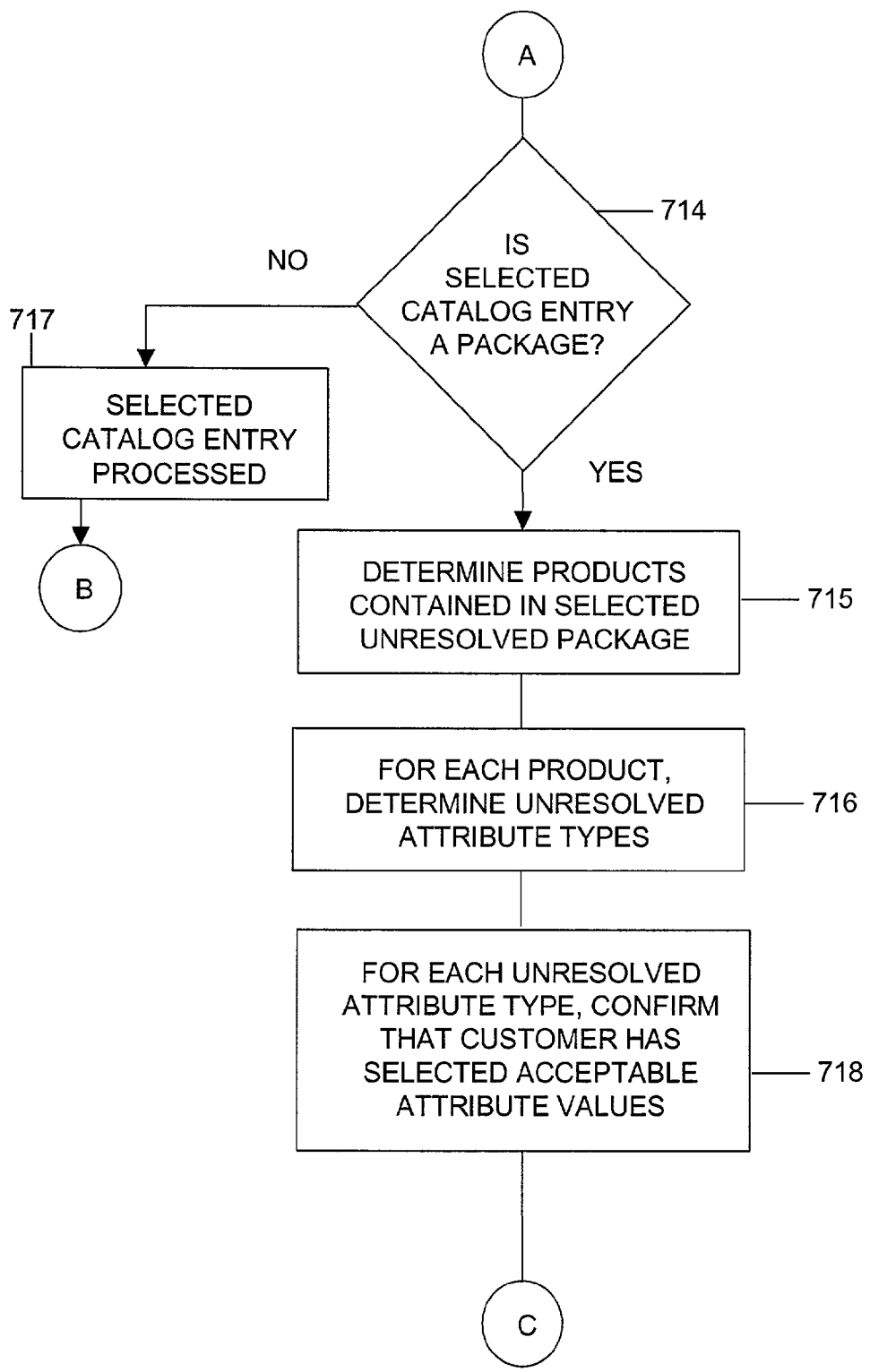
Figure 3C:
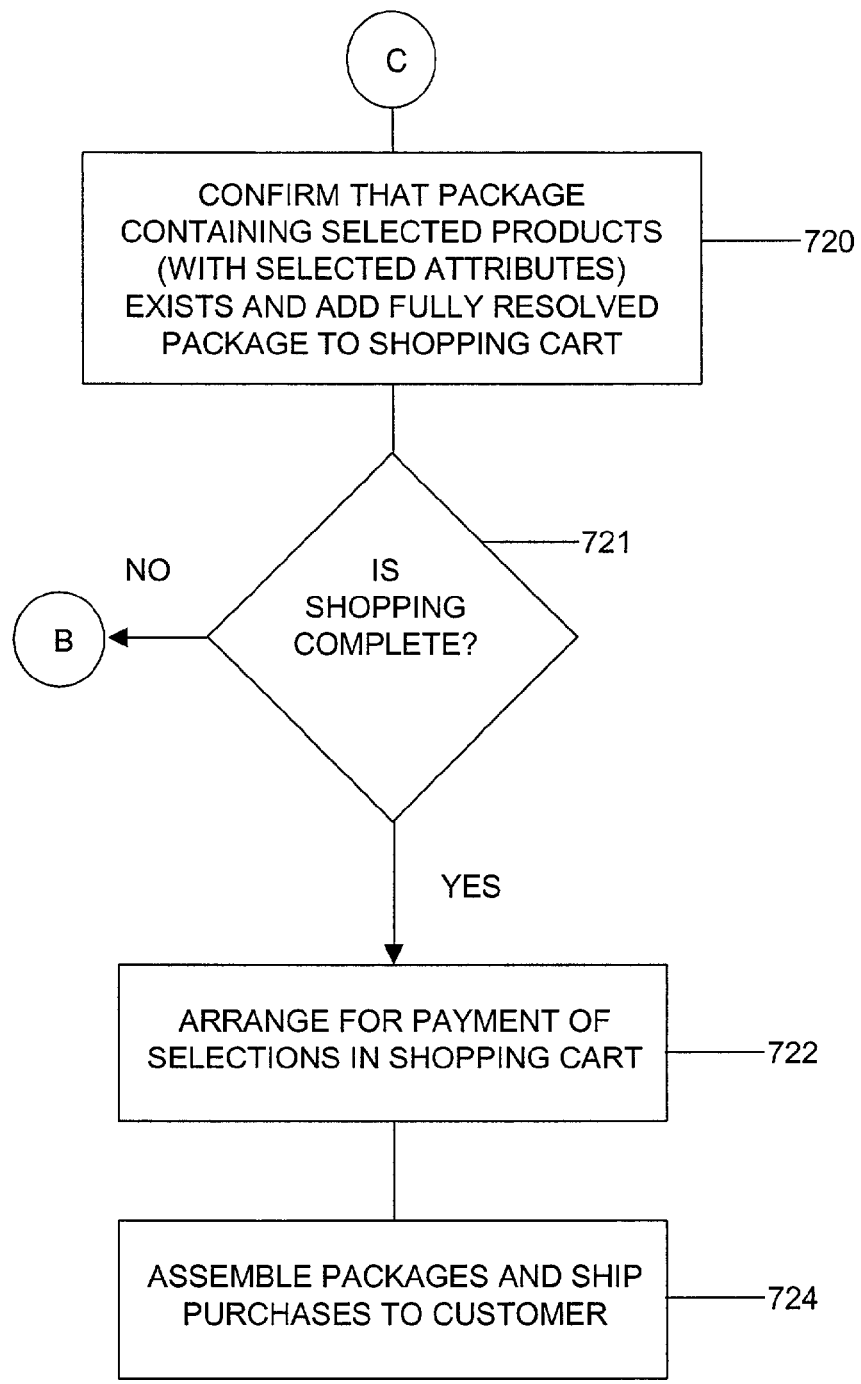

FIGS. 3A-3C together illustrate the steps of the method 700 carried out by the system 10 made in accordance with the subject invention.

Once the customer 26 has accessed the catalog subsystem 12, typically using a web browser connected to the internet 24, the customer 26 is able to browse through the various merchandise and services offered for sale, as contained in the catalog entry table 500. (Block 702)

Preferably, only unresolved packages 526 available for purchase (in addition to products 520 and items 522) will be presented to the customer 26. In this regard, typically the display module 18 will display a photograph of one fully resolved package 528 correlated to the unresolved package 526 as a sample of the various resolved packages 528 or options available (again correlated to the unresolved package 526), as well as the relevant pricing and other marketing information contained in the relevant description field 554 for the unresolved package 526. Typically, the catalog entry table 500 will also include a link between entries in the table 500 and photographic images to be displayed to the consumer 26. (Block 704)

Once a customer 26 selects a catalog entry for purchase through the selection module 19 (typically by triggering a "button" displayed by the display module 18 near an image or other identifier of the desired merchandise or services or by activating a link, as will be understood), the selection module 19 determines the catalog entry identifier 550 correlated to the catalog entry selected by the customer 26. (Block 706)

The catalog subsystem 12 then determines what the type of the selection is, by looking up the type 552 correlated to the selected catalog entry identifier 550. If the type 552 of the selection indicates that it is an item 522 (Block 708), the catalog subsystem 12 will simply add the selected item 522 to the customer's 26 shopping cart, as will be understood (Block 710). The consumer 26 can then continue browsing through the electronic catalog at Block 704.

If the type 552 of the selection indicates that it is a product 520 (Block 712), the catalog subsystem 12 requires the customer to designate the desired attribute values for the product 520, and ensures that the product 520 is fully resolved into an item 522, in a manner similar to that described in relation to Blocks 716-718, as discussed below (Block 713). The consumer 26 can then continue browsing through the electronic catalog at Block 704.

If the type 552 of the selection indicates that it is an unresolved package 526 (Block 714), the resolution module 20 then determines the products 520 possessed by the selected unresolved package 526, by matching the selected catalog entry identifier 550 with package identifiers 600, stored in the package relationship table 510. (Otherwise, if the selection is of a type other than item, product or package, the selection is processed accordingly (Block 717).) In the sample data provided, for explanatory purposes, it will be assumed that the unresolved package 526 selected by the customer 26 has "150" as its catalog entry identifier 550. It should be understood that while the sample data only contains one unresolved package 526, typically the catalog database 22 will contain data correlated to numerous unresolved packages 526. In the sample provided, the data contained in the package relationship table 510 indicates that the selected package 526 contains two products 520, having component identifiers 602 "101" and "102", respectively (which correlate to products 520 having matching catalog entry identifiers 550, ie. the sweater and the gloves). (Block 715)

For each product 520 contained in the selected package 526 (which will be referred to as a "selected product" 520), the resolution module 20 then determines the attribute types 562 possessed by the selected product 520 (which will be referred to as "selected attribute types" 562), by matching the catalog entry identifiers 550 of the selected product 520 with product identifiers 564, stored in the product attribute table 502. In the example provided, the resolution module 20 "determines" that the selected sweater product 520 has two unresolved selected attribute types 562 (sweater-size and sweater-colour) and that the selected gloves product 520 has one unresolved selected attribute type 562 (gloves-material) that must be resolved in order to complete the purchase. (Block 716)

As will be understood, for each such selected attribute 562 (and correlated attribute identifier 560) for each selected product 520, the resolution module 20 requires the customer 26 to select attribute values for the selected product 520. The resolution module 20 ensures that the customer 26 has selected attribute values 574 found in the attribute value field 574 of the product attribute value table 504 having an attribute identifier 572 matching that of the selected attribute identifier 560. The corresponding selected item identifier 576 (which corresponds to the related catalog entry identifier 550) is then determined. If the item identifiers 576 for all of the selected attribute values 574 for a selected product 520 do not match, or if an acceptable attribute value 574 cannot be located in the table 504, the resolution module 20 will direct the consumer 26 to either specify acceptable attribute values 574 or will reject the selection of the product 526. (Block 718)

Once the selected catalog entry identifiers 550 have been determined for the selected products 520, the resolution module 20 then matches the selected catalog entry identifiers 550 with the component identifiers 604 ("selected component identifiers") in the package relationship table 510. If a package identifier 600 can be located in the relationship table 510 which correlates to all of the selected component identifiers 604, the catalog entry identifier 550 matching the selected package identifier 600 is then added to the customer's 26 shopping cart, as will be understood. If such an acceptable package identifier 600 cannot be located in the table 510, the resolution module 20 will direct the consumer 26 to either redesignate acceptable attribute values 574 or will reject the selection of the unresolved package 526. (Block 720)

Once the customer 26 has completed deciding which merchandise and services to purchase (Block 721), the selected catalog entry identifier 550 (for the selected fully resolved package 528 and any other selections in the shopping cart) and related pricing information is used by the ordering subsystem 14 to arrange for the payment of the purchase(s) (typically by credit card) by the customer 26 in a known manner. (Block 722)

As well, the SKU data 556 correlated to the selected catalog entry identifier 550 is forwarded to the fulfillment division 16 (typically a warehouse), where the contents of the selected package 528 are assembled and then shipped to the consumer 26. (Block 724)

While the sample data provided in FIGS. 2A-2F identifies a fully resolved package 528 corresponding to each possible combination of attribute values 574 for each component product 520, it should be understood that in some instances, a fully resolved package 528 may not be available having certain attributes. One possible reason for such a situation may be for promotional advantage—even though a product having certain fully resolved attribute values (ie. a corresponding item 522) may be available for purchase individually, those specific attributes may not be available in a similar product available for purchase in a package. For example, while green and blue sweaters may be selling poorly individually (at the same time as red sweaters are generating significant sales), a gloves and sweater package may be created in which only blue and green sweaters are available for purchase in the package.

As should be understood, the use of packages provides the advantage that a package is treated as a single atomic unit, for which a single price can be charged. Once a package has been selected by a consumer 26, only the fully resolved package (and not its constituent item components) is added to his or her "shopping cart" (as will be understood). As a result, the constituent components cannot be modified. The consumer 26 can choose to increase the number of packages to be purchased, or can remove the package from the order.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer system for enabling the purchase of a package comprising:
    a catalog database comprising:
        a catalog entry table including package data correlated to at least one unresolved package, wherein a package is a group of pieces of merchandise to be sold together, wherein an unresolved package is a package having one or more products with at least one unresolved attribute, wherein a product is a piece of merchandise that has at least one unresolved attribute, and wherein an unresolved attribute is an attribute value that has not been specified by a customer, wherein the catalog entry table stores a catalog entry identifier (ID) for each product;
        a product attribute table that stores attributes, wherein each attribute is associated with a catalog entry ID in the catalog entry table;
        a product attribute value table that stores attribute values, wherein each attribute value is associated with an attribute in the product attribute table;
        a package attribute table that stores attribute IDs, wherein each attribute ID is associated with an attribute value in the product attribute value table; and
        a package relationship table that stores package IDs, wherein each package ID is associated with an attribute value in the in the package attribute table;
    a selection module coupled to the catalog database for allowing the customer to select at least one unresolved package for purchase; and
    a resolution module coupled to the catalog database for resolving the at least one unresolved attribute of the one or more products in the selected unresolved package by matching a selected catalog entry ID from the catalog entry table with a corresponding package ID in the package relationship table, wherein the corresponding package ID indicates a resolved package, and wherein the selected catalog entry ID matches the package ID after the customer has selected an attribute value for the at least one unresolved attribute, wherein the selected attribute value corresponds to an attribute value in the product attribute value table, and wherein the elements above are implemented by a computer.

2. The system of claim 1 wherein the catalog database further comprises:
    item data correlated to a plurality of items, wherein each item is fully resolved;
    a product attribute table that defines for each product at least one attribute type associated with the product; and
    a product attribute value table that defines at least one value for each attribute type.

3. The system of claim 1, wherein the catalog database further comprises image data correlated to the at least one package.

4. The system of claim 1, further comprising a connection to a global communications network.

5. The system of claim 1, wherein the product attribute table stores product ID and attribute ID tuples, wherein each product ID and attribute ID tuple corresponds to an attribute, wherein at least one product ID is associated with a catalog ID in the catalog entry table;
    wherein the product attribute value table that stores attribute ID and attribute value ID tuples, wherein each attribute ID and attribute value ID tuple corresponds to an attribute value, wherein at least one attribute ID in the product attribute value table is associated with a one attribute ID in the product attribute table;
    wherein the package attribute table that stores attribute ID and package attribute ID tuples, wherein each attribute ID and package attribute ID tuple corresponds to a package ID, wherein at least one attribute ID is associated with an attribute ID in the product attribute table;
    wherein the package relationship table that stores package ID and component ID tuples, wherein each package ID and component ID tuple corresponds to a package type, wherein at least one package ID is associated with a package ID in the product attribute table;
    wherein the selected attribute value corresponds to an attribute value corresponding to an attribute ID and attribute value ID tuple in the product attribute value table.

6. The system of claim 1, wherein a catalog subsystem includes the catalog database, the selection module and the resolution module.

7. The system of claim 6, further comprising an ordering module coupled to the catalog subsystem.

8. The system of claim 7, further comprising a payment module coupled to the ordering module.

9. The system of claim 8, further comprising a delivery subsystem coupled to the payment module.

10. A computer-implemented method for enabling the purchase of a package, comprising:
    providing a catalog database comprising:
        a catalog entry table including package data correlated to at least one unresolved package, wherein a package is a group of pieces of merchandise to be sold together, wherein an unresolved package is a package having one or more products with at least one unresolved attribute, wherein a product is a piece of merchandise that has at least one unresolved attribute, and wherein an unresolved attribute is an attribute value that has not been specified by a customer, wherein the catalog entry table stores a catalog entry identifier (ID) for each product;
        a product attribute table that stores attributes, wherein each attribute is associated with a catalog entry ID in the catalog entry table;
        a product attribute value table that stores attribute values, wherein each attribute value is associated with an attribute in the product attribute table;
        a package attribute table that stores attribute IDs, wherein each attribute ID is associated with an attribute value in the product attribute value table; and
        a package relationship table that stores package IDs, wherein each package ID is associated with an attribute value in the in the package attribute table;
    allowing the customer to select at least one unresolved package for purchase; and
    resolving the at least one unresolved attribute of the one or more products in the selected unresolved package by matching a selected catalog entry ID from the catalog entry table with a corresponding package ID in the package relationship table, wherein the corresponding package ID indicates a resolved package, and wherein the selected catalog entry ID matches the package ID after the customer has selected an attribute value for the at least one unresolved attribute, wherein the selected attribute value corresponds to an attribute value in the product attribute value table, and wherein the steps above are implemented by a computer.

11. The method as claimed in claim 10, wherein the catalog database further comprises a product attribute table and a product attribute value table, wherein the product attribute table defines for each product at least one attribute type associated with the product, and the product attribute value table defines at least one value for each attribute type.

12. The method as claimed in claim 11, wherein resolving step comprises utilizing the catalog entry table to determine automatically the one or more products in the selected unresolved package.

13. The method as claimed in claim 12, wherein resolving step further comprises, for each of the one or more products in the selected unresolved package, utilizing the product attribute table to determine automatically the at least one unresolved attribute type.

14. The method as claimed in claim 13, wherein resolving step further comprises allowing the customer to select an attribute value from the product attribute value table for the at least one unresolved attribute type thereby resolving the selected package.

15. A program product stored on a computer readable storage medium, the program product for enabling the purchase of a package, comprising:
   a catalog database comprising:
      a catalog entry table including package data correlated to at least one unresolved package, wherein a package is a group of pieces of merchandise to be sold together, wherein an unresolved package is a package having one or more products with at least one unresolved attribute, wherein a product is a piece of merchandise that has at least one unresolved attribute, and wherein an unresolved attribute is an attribute value that has not been specified by a customer, wherein the catalog entry table stores a catalog entry identifier (ID) for each product;
      a product attribute table that stores attributes, wherein each attribute is associated with a catalog entry ID in the catalog entry table;
      a product attribute value table that stores attribute values, wherein each attribute value is associated with an attribute in the product attribute table;
      a package attribute table that stores attribute IDs, wherein each attribute ID is associated with an attribute value in the product attribute value table; and
      a package relationship table that stores package IDs, wherein each package ID is associated with an attribute value in the in the package attribute table;
   a selection module coupled to the catalog database for allowing the customer to select at least one unresolved package for purchase; and
   a resolution module coupled to the catalog database for resolving the at least one unresolved attribute of the one or more products in the selected unresolved package by matching a selected catalog entry ID from the catalog entry table with a corresponding package ID in the package relationship table, wherein the corresponding package ID indicates a resolved package, and wherein the selected catalog entry ID matches the package ID after the customer has selected an attribute value for the at least one unresolved attribute, wherein the selected attribute value corresponds to an attribute value in the product attribute value table, and wherein the elements above are implemented by a computer.

16. The program product of claim 15, wherein the catalog database further comprises:
   item data correlated to a plurality of items, wherein each item is fully resolved;
   a product attribute table that defines for each product at least one attribute type associated with the product; and
   a product attribute value table that defines at least one value for each attribute type.

17. A computer-readable storage medium containing programming instructions for enabling purchase of a package, comprising the instructions of:
   providing a catalog database comprising:
      a catalog entry table including package data correlated to at least one unresolved package, wherein a package is a group of pieces of merchandise to be sold together, wherein an unresolved package is a package having one or more products with at least one unresolved attribute, wherein a product is a piece of merchandise that has at least one unresolved attribute, and wherein an unresolved attribute is an attribute value that has not been specified by a customer, wherein the catalog entry table stores a catalog entry identifier (ID) for each product;
      a product attribute table that stores attributes, wherein each attribute is associated with a catalog entry ID in the catalog entry table;
      a product attribute value table that stores attribute values, wherein each attribute value is associated with an attribute in the product attribute table;
      a package attribute table that stores attribute IDs, wherein each attribute ID is associated with an attribute value in the product attribute value table; and
      a package relationship table that stores package IDs, wherein each package ID is associated with an attribute value in the in the package attribute table;
   allowing the customer to select at least one unresolved package for purchase; and
   resolving the at least one unresolved attribute of the one or more products in the selected unresolved package by matching a selected catalog entry ID from the catalog entry table with a corresponding package ID in the package relationship table, wherein the corresponding package ID indicates a resolved package, and wherein the selected catalog entry ID matches the package ID after the customer has selected an attribute value for the at least one unresolved attribute, wherein the selected attribute value corresponds to an attribute value in the product attribute value table, and wherein the steps above are implemented by a computer.

18. The computer-readable storage medium in claim 17, wherein the catalog database further comprises a product attribute table and a product attribute value table, wherein the product attribute table defines for each product at least one attribute type associated with the product, and the product attribute value table defines at least one value for each attribute type.

19. The computer-readable storage medium in claim 18, wherein the resolving step instruction comprises utilizing the catalog entry table to determine automatically the one or more products in the selected unresolved package.

20. The computer-readable storage medium in claim 19, wherein the resolving step instruction further comprises, for each of the one or more products in the selected unresolved package, utilizing the product attribute table to determine automatically the at least one unresolved attribute type.

21. The computer-readable storage medium in claim 17, wherein the resolving step instruction further comprises allowing the customer to select an attribute value from the product attribute value table for the at least one unresolved attribute type thereby resolving the selected package.

22. The computer-readable storage medium of claim 17 wherein said medium is a recordable data storage medium.

* * * * *